UNITED STATES PATENT OFFICE.

KARL GILG, OF GROSS-LICHTERFELDE, NEAR BERLIN, AND ERNST GILG, OF STEGLITZ, NEAR BERLIN, GERMANY.

MANUFACTURE OF BEVERAGES CONTAINING CARBON DIOXID.

1,000,596. Specification of Letters Patent. Patented Aug. 15, 1911.

No Drawing. Application filed April 19, 1910. Serial No. 556,360.

*To all whom it may concern:*

Be it known that we, KARL GILG, merchant, residing at 69ª Holbeinstrasse, Gross-Lichterfelde, near Berlin, Kingdom of Prussia, German Empire, and ERNST GILG, professor of pharmacology, residing at 33 Arndtstrasse, Steglitz, Kingdom of Prussia, German Empire, subjects of the King of Prussia and the German Emperor, have jointly invented new and useful Improvements in the Manufacture of Beverages Containing Carbon Dioxid, of which the following is a specification.

The manufacture of beverages free from alcohol, or containing but little alcohol, has hitherto been effected either by removing the alcohol from fermented liquids, and, if required, treating the residue with carbon dioxid, or by forcing carbon dioxid into a solution of fruit juices and vegetable extracts. The first mode of manufacture is costly, while the second mode presents the disadvantage that the carbon dioxid, being only in mechanical combination, rapidly escapes from the liquor when the vessel containing it is opened.

The process of manufacturing, in accordance with this invention, beverages free from alcohol, or containing but little alcohol, consists in subjecting sugar-containing solutions of all kinds (which may, if desired, be mixed with substances for imparting a pleasant taste, or odor), to fermentation by means of a special kind of yeast by means of which carbon dioxid is evolved from sugar, whereas but little alcohol is formed. No process has hitherto been known by which beverages free from alcohol, or containing but little alcohol, can be obtained by the direct action of a yeast. The yeasts suitable for the purposes of this invention are very generally procurable. They are, for instance, found in the sugar, or honey, exudated from the nectaries of blossoms, but they pass also from the said nectaries or blossoms to parts of the plants, and also on other objects. The yeasts of the said group are characterized by the fact that they only decompose certain small portions of even large amounts of sugar. The amount of the formed carbonic acid will be sufficient for giving to the beverage the character of a sparkling beverage having the character of the sparkling beverages produced by fermentation. Pectic or mucilaginous substances which are also formed during the fermentation process are important by assisting to the said intimate absorption of the carbonic acid.

Especially suitable yeasts are found in the nectaries of the blossoms of the lime tree and of the elder tree, and this process may be carried out by mixing sugar-containing liquid, for instance the juices of fruits, with blossoms from the linden tree, or elder tree. The amount of the blossom to be added depends upon the rapidity with which the fermentation is to take place. Either fresh, or dried, blossoms may be used. If dried blossoms be used, care should be taken that the drying is effected at a temperature such that the ferments are not killed. The yeast present in nectaries of the blossoms of lime tree and of the elder tree form a natural biological group containing a yeast of large cells, of spiculatus, of mold, of torula. The yeast of large cells forms on wort gelatin at first curled layers, which become then smooth. It ferments dextrose, levulose, mannose, cane sugar, maltose, raffinose, but only small amounts of galactose and methylated glucoside. The spiculatus yeast forms very large colonies and is injured by want of air. It ferments dextrose, levulose and mannose. The mold yeast has long cells of a brilliant content and well shaped vacuols. The colonies formed on wort gelatin appear as if flour had been spread over. It ferments dextrose, levulose, mannose, but only small amounts of galactose. The torula yeast has globe like cells weak in light refracting contents. It ferments dextrose, levulose, mannose, cane sugar and raffinose, but only small amounts of galactose and trehalose.

The concentration of the sugar-containing solutions used and their nature depend upon the flavor to be imparted to the beverage. It is possible to use all sugar-containing fruits and fruits from which sugar can be formed, for instance, lemons, oranges, apples, pears, currants, gooseberries, cherries, strawberries, blackberries, grapes, and the like. There may be added to the sugar solutions other substances to impart any desired flavor such as ethereal oils, or vegetable products containing ethereal oils, fruit juices or such like. Solutions of pure sugar may be used which have been admixed with substances to impart flavor. Also corn, potatoes, or other starch-containing substances may be mashed. If desired hop or other flavoring substances may be added to the mash.

Although the process may be carried out by mixing the sugar solution to be fermented with blossoms as aforesaid, the best results are obtained by using a pure culture of the ferment. Pure cultures of the ferment may be obtained as follows: The blossoms are introduced into a 10 per cent. sugar solution and allowed to stand for about 30 hours at a temperature of from 25°, to 30°, centigrade. Within that time the ferment has revived and increased so much that a slight fermentation becomes perceptible. A small amount of the liquid is drawn off by suction and treated according to any known or suitable culture process. In this way separate cultures are obtained which are introduced to fresh sterilized feeding grounds. The pure cultures obtained are tested to ascertain whether they produce a sufficiently rapid fermentation without evolution of any objectionable amount of alcohol. From the best yeasts thus found pure cultures are produced in such quantity as is required for use in practice.

The carrying out of the fermentation process both with the blossom, and with the yeasts obtained and isolated from it, may be carried out as follows: The fermentation is effected in two phases, namely: the preliminary fermentation in which the ferment is developed and caused to grow whereas air is allowed access and the main fermenting process in which the sugar is decomposed under exclusion of air and the beverage obtained. In the preliminary fermenting process the sugar solution, or mash, to which any required amount of vegetable matter necessary to give the proper flavor is added is mixed in open vats with as much pure yeast culture as possible, whereupon a strong preliminary fermentation takes place. The highly fermenting, turbid, liquor is charged into bottles or other suitable receptacles, wherein it is subjected to the main fermentation, air being excluded. If the fermentation takes place in bottles, or the like, the ferment and fermentation residues settle at the bottom, while the beverage, which contains much carbon dioxid, becomes purified. In dispensing the final product, it may become cloudy, and in order to avoid this the main fermentation may be caused to take place in sufficiently large closed receptacles such that the liquid containing carbon dioxid can be drawn down to a level above the sediment, without the production of froth, or loss of carbon dioxid.

In order to illustrate the manner in which the process may be carried out, we give the following example: We prepare a solution containing 10% of sugar, add a suitable organic acid, for instance malic acid or the acids obtained from fruits, add a fruit juice and add elder-flowers. Then we allow the mixture to stand in an open vessel at about 25 degrees centigrade during 2 days. After this time we separate the liquid from the flowers and bring it into a closed receptacle resisting to a pressure of about 8 atmospheres. In this receptacle I allow the yeast to act at about 30 degrees centigrade, the air being excluded. The fermenting process will cease after about 4 days. Then we may bring the beverage containing carbonic acid produced by fermentation into bottles or similar vessels. The beverage contains but small proportions of alcohol, about 0.5–0.7 per cent. by volume and large quantities of carbonic acid.

We claim:

The process for manufacturing beverages containing but little alcohol, which consists in mixing solutions containing sugar with blossoms having nectaries, introducing air, allowing the yeast present in the said nectaries to grow, interrupting the access of air and allowing the mixture to ferment under pressure.

In testimony whereof we affix our signatures in presence of two witnesses.

KARL GILG.
ERNST GILG.

Witnesses:
 HENRY HASPER,
 WOLDEMAR HAUPT.

---

Copies of this patent may be obtained for five cents each, by addressing the "Commissioner of Patents, Washington, D. C."